Sept. 10, 1968  E. E. HOOD  3,400,605
BICYCLE SHIFT CONTROL
Filed May 31, 1966  2 Sheets-Sheet 1
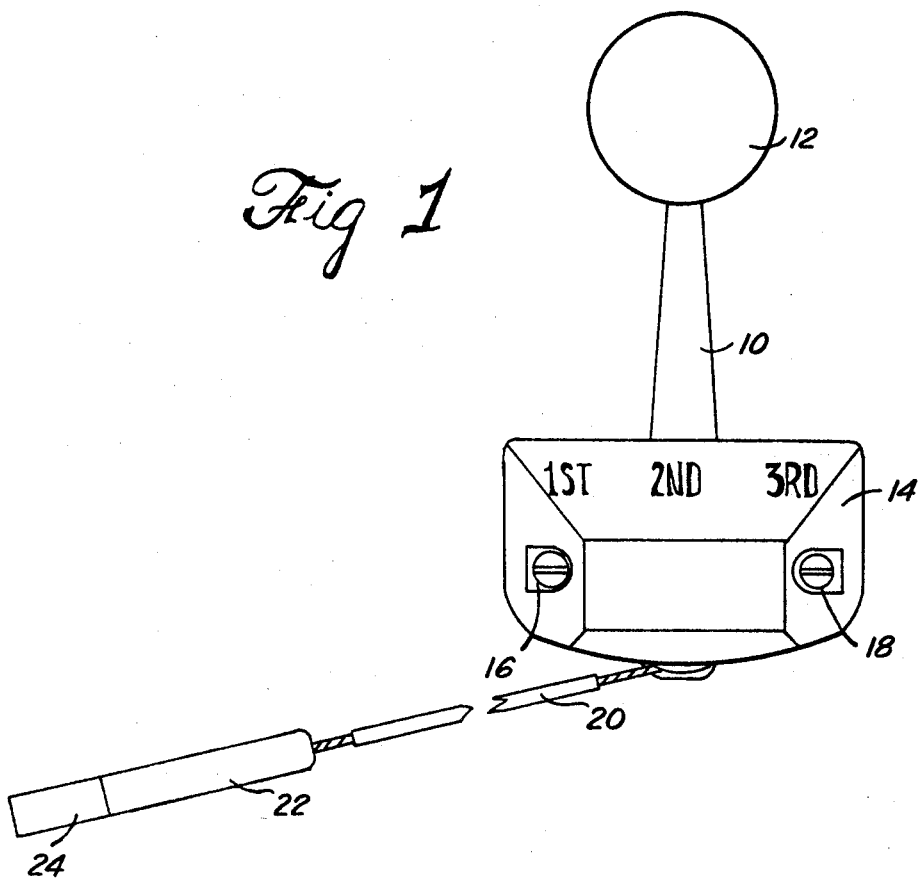
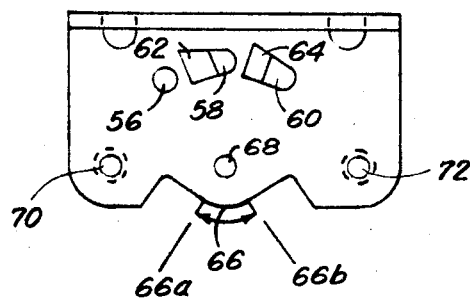
INVENTOR.
*EDWIN ELLIOTT HOOD*
BY Sept. 10, 1968     E. E. HOOD     3,400,605
BICYCLE SHIFT CONTROL
Filed May 31, 1966     2 Sheets-Sheet 2
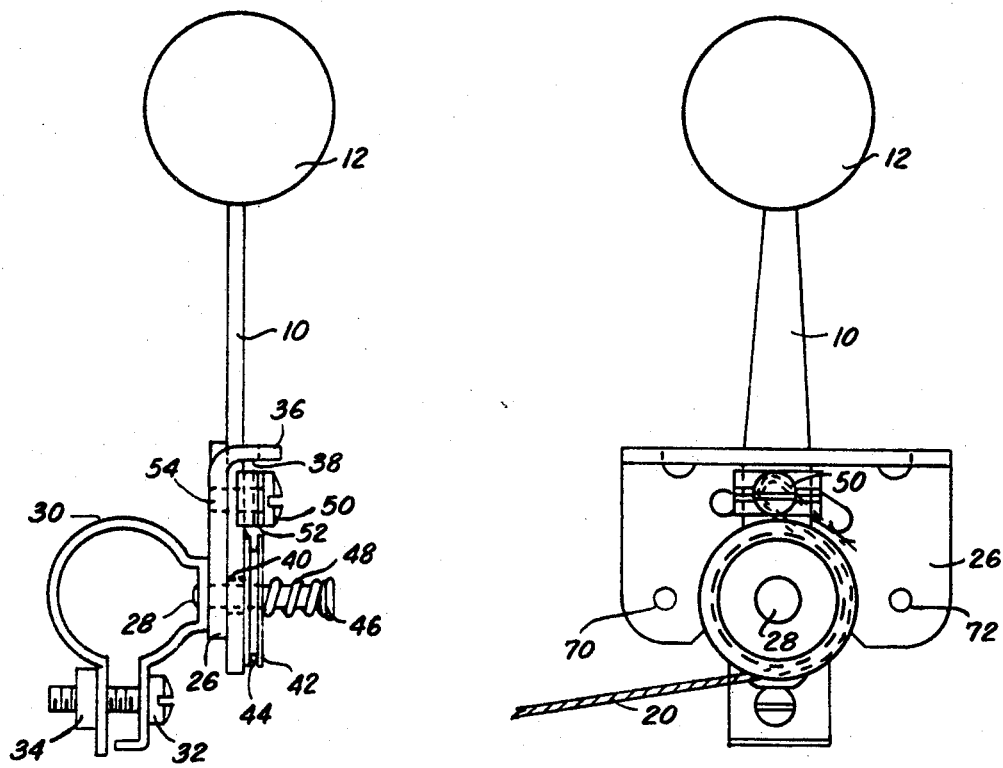
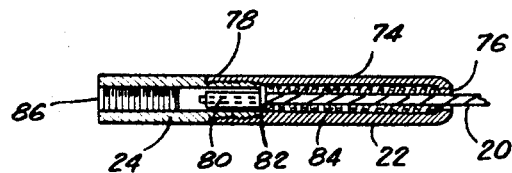
INVENTOR.
EDWIN ELLIOTT HOOD

United States Patent Office 3,400,605
Patented Sept. 10, 1968

3,400,605
BICYCLE SHIFT CONTROL
Edwin Elliott Hood, Elmira, N.Y., assignor to The
Bendix Corporation, a corporation of Delaware
Filed May 31, 1966, Ser. No. 554,009
2 Claims. (Cl. 74—501)

ABSTRACT OF THE DISCLOSURE

A manual shift control for a multi-speed bicycle. Shift position is maintained by the interaction of spaced detents in the housing-backing plate and a screw projecting from the shift lever which is, in turn, spring-biased toward the housing-backing plate. By combining the cable anchor and pulley on the shift lever, the cable is protected from failure due to flexing. A pivot edge in cooperative association with ramp surfaces allows a known and constant side load to be applied to the lever.

---

The present invention relates to a bicycle shift control and, more particularly, to a shift control adapted to physically shift a multi-speed bicycle hub or other speed shift mechanism by manual hand shift manipulation.

It is an object of the present invention to provide a manually manipulated positive shift control for bicycles adapted to be mounted on a bicycle frame and having certain uniform shifting motion between gears, high mechanical advantage, durability, and positive shifting location features.

Other objects and advantages will become apparent on consideration of the accompanying description and drawings wherein:

FIGURE 1 is an external side view of my shift mechanism;

FIGURE 2 is a side view with external case removed showing an internal operating mechanism of my device;

FIGURE 3 is an end view of the shift control as illustrated in FIGURE 2;

FIGURE 4 is a section view of a cable overload link; and

FIGURE 5 shows a backing plate member.

Referring to FIGURE 1, my bicycle shift control in external configuration is designed to simulate an automotive floor shift mechanism and comprises a relatively-long shift lever 10 with a handle, nob (or bar) 12 at one end to be manually grasped by the operator. A casing 14, which may be decorative, is secured by two screws 16 and 18. Gear shift indicia may be marked on the casing 14, if desired, as illustrated. Cable 20 extends from the lower end of casing 14 and contains an overload link 22 and adapter 24. Adapter 24 is for attachment to a manually positionable three-speed hub or other bicycle gear shift mechanism, not shown.

Referring now to FIGURES 2 and 3, two views of my shift mechanism with external case 14 removed are shown. A backing plate 26 is secured by fixed rivet or stub shaft 28 to strap clamp 30. Clamp 30 is adapted to clamp a bicycle tubular frame member and tightened by screw 32 and nut 34 so that backing plate 26 is firmly anchored to the bicycle frame. Backing plate has a bent over flange 36 forming the top section of my shift control and which contains an elongated slot 38 in which the lever 10 is freely inserted and able to move in arcuate fashion. Lever 10 projects below backing plate 26 and is generally flush thereagainst. An enlarged locating hole 40 is formed in lever 10 which locates the lever in a proximate way relative to rivet or shaft 28. As will later be described, lever 10 can be manipulated in two planes and ample clearance between hole 40 and rivet or shaft 28 is provided for this operation.

Cable drum 42 is fixedly secured to lever 10 about rivet 28 and has a peripheral groove 44 adapted to receive cable 20. Rivet 28 has an enlarged head 46 which forms a retainer for coil spring 48 which, on its other end, abuts against drum 42, providing a force urging lever 10 flush against the backing plate. Located upwardly on lever 10, relative to drum 42, is a detent screw 50 and copper cable holding clamp 52. Screw 50 has an end 54 extending into the backing plate.

Referring to FIGURE 5, there is a plan view of backing plate 26 showing, in particular, three locating holes 56, 58 and 60 for receiving the end 54 of detent screw 50. Holes 58 and 60 have inwardly-extending inclined ramp portions 62 and 64, respectively, which are flush with the backing plate at their leftmost extremity and extend progressively inwardly toward holes 58 and 60. A pivot circumferential edge 66 spanning the arc from 66a to 66b is formed in the lower edge of backing plate 26 approximately a uniform diametrical distance from pivot hole 68. Backing plate 26 also contains holes 70 and 72 for receiving casing 14, holding screws 16 and 18.

Referring now to FIGURE 4, an overload link 22 and adapter 24 are illustrated in section. The overload link consists of a tubular casing 74 substantially enclosed at the right end, except a cable receiving opening 76 and threaded at the other end 78 to receive adapter 24. Cable 20 extends longitudinally through casing 14 and is anchored in movable plunger 80 which has a flange 82 normally abutting the end of adapter 24. A coil spring 84 is contained in casing 74 concentric with cable 20 and abuts the substantially closed end of the casing on one end and flange 82 of the movable plunger on the other. Adapter 24 is internally threaded at 86 for an attachment with any multi-speed shift device. It will be apparent that when supplied in kit form, a number of adapters 24 may be supplied with internal threads 86 fitting a number of well known hub types.

Some of the operating characteristics of my shift control are next described. The provision of ramps 62 and 64 on the two higher speed shift holes 58 and 60 in the backing plate allow the operator to down shift by a straight pull toward him, assuming that the shift control is mounted in a location comparable to a cross bar on a boy's bike. The end 54 of the detent screw rides up the ramp, forcing lever 10 slightly counterclockwise as viewed in FIGURE 3 and out of its flush relationship with backing plate 26. This movement is against the bias of coil spring 48 which snaps the lever back as soon as the detent screw finds the next hole. During this manipulation, the pivot locus of lever 10 is along pivot edge 66 which thus provides a uniform pivot radius. This permits not only uniform movement and mechanical advantage, but also uniform compression of spring 48 so that a known load may be applied to lever 10 with minimum length spring. Positive location of the lever is obtained by a side load applied by spring 48 such that if the detent is left on a ramp section, the force component is sufficient to move the lever into a hole location. In most hubs, a spring force exists which assists this action so that the lever will seek one of the positive locations. Many hubs are capable of being left in a neutral position if not precisely located. This can be a dangerous condition for coaster brake hubs since the brake cannot be actuated in some designs if the multi-speed shift is in a neutral position. The space between the ramp and adjacent hole is kept to a minimum and the end of detent screw rounded to leave practically no stable locations between positive locations and none at all when the hub spring bias is considered.

Forward or up-shifting movement is accomplished by a side movement of the lever to disengage the detent and a manual forward positioning of the lever to the desired position.

Cable 20 is wrapped around drums 42 in groove 44, traversing approximately 180° from lower to the upper end and is passed under copper clamp 52 and secured by the force applied by the head end of detent screw 50. I have found that a copper or copper plated clamp to provide a significantly greater friction gripping force than other materials firmly resisting cable pull out with great abuse.

Drum 42 will give a constant lever ratio for cable travel, regardless of lever position. It also reduces the possibility of cable failure due to flexing at the anchor point since the relationship of the cable guide to the anchor point remains unchanged regardless of lever position.

Because of the high leverage ratio compared, for example, to finger or wrist click shift devices, overload link 22 is provided between shift lever and hub. This device has a preload spring on spring 84 set sufficiently high so that compression of this spring does not take place under normal operating conditions. However, if the hub should not freely shift so that the preload of spring 84 is exceeded, it will compress and avoid cable damage, either by stretch or pull out.

The present invention has been disclosed with reference to a preferred embodiment; however, it will be understood that variations in the detailed parts may be made without departing from the scope and spirit of the present invention as defined in the appended claims.

I claim:
1. A bicycle manual shift control comprising:
   a backing plate member having a plurality of arcuately-spaced detent holes formed therein;
   a stub shaft member secured to said backing plate and extending substantially normally thereto;
   said backing plate having a pivot edge formed a uniform radial distance from said stub shaft;
   a lever member generally flush with said backing plate and having a hole formed therein for mounting about said stub shaft while providing clearance relative thereto;
   said lever member overhanging said pivot edge and pivotable thereon in one direction of lever motion;
   resilient means concentrically mount about said stub shaft to provide a biasing force urging said lever against said backing plate; and
   a detent projection member secured to said lever member having an extending end radially aligned with the arcuate location of said detent holes and cable and clamp means secured to said lever for movement therewith.

2. A bicycle shift control comprising:
   a backing plate member having a plurality of arcuately-spaced detent holes formed therein;
   a stub shaft member secured to said backing plate and extending substantially normally thereo;
   a lever member generally flush with said backing plate and
      having a hole formed therein for mounting about said stub shaft while providing clearance relative thereto;
   resilient means concentrically mounted about said stub shaft to provide a biasing force urging said lever against said backing plate;
   cable and clamp means secured to said lever for movement therewith; and
   a detent projection member secured to said lever member having an extending end radially aligned with the arcuate location of said detent holes, said detent projection member operative to secure said cable and clamp means to said lever member.

References Cited
UNITED STATES PATENTS

| | | | |
|---|---|---|---|
| 865,805 | 9/1907 | Sangster | 74—489 |
| 1,367,318 | 2/1921 | Horton | 74—487 XR |
| 1,606,099 | 11/1926 | Rudolph | 74—501 |
| 2,825,246 | 3/1958 | Richards. | |
| 3,020,778 | 2/1962 | Davidson | 74—489 |

FRED C. MATTERN, JR., *Primary Examiner*

C. F. GREEN, *Assistant Examiner.*